US012408215B2

United States Patent
Wang et al.

(10) Patent No.: US 12,408,215 B2
(45) Date of Patent: Sep. 2, 2025

(54) METHODS AND APPARATUS OF PATH SWITCH BASED SERVICE CONTINUITY FOR UE-TO- NETWORK RELAY

(71) Applicant: MediaTek Singapore Pte. Ltd., Singapore (SG)

(72) Inventors: Xuelong Wang, Beijing (CN); Nathan Edward Tenny, San Jose, CA (US)

(73) Assignee: MediaTek Singapore Pte. Ltd, Singapore (SG)

( * ) Notice: Subject to any disclaimer, the term of this patent is extended or adjusted under 35 U.S.C. 154(b) by 403 days.

(21) Appl. No.: 17/817,298

(22) Filed: Aug. 3, 2022

(65) Prior Publication Data
US 2022/0377822 A1    Nov. 24, 2022

Related U.S. Application Data

(63) Continuation of application No. PCT/CN2021/075459, filed on Feb. 5, 2021, which is
(Continued)

(30) Foreign Application Priority Data

Feb. 6, 2020    (WO) ................ PCT/CN2020/074410
Feb. 5, 2021    (WO) ................ PCT/CN2021/075459

(51) Int. Cl.
*H04L 12/00*    (2006.01)
*H04W 24/10*    (2009.01)
(Continued)

(52) U.S. Cl.
CPC ........... *H04W 76/14* (2018.02); *H04W 24/10* (2013.01); *H04W 36/033* (2023.05);
(Continued)

(58) Field of Classification Search
CPC ... H04W 76/14; H04W 24/10; H04W 36/033; H04W 76/20; H04W 88/04; H04W 92/18; H04W 76/23
(Continued)

(56) References Cited

U.S. PATENT DOCUMENTS

10,499,272 B2 * 12/2019 Panteleev ........... H04W 72/044
11,304,180 B2 *  4/2022 Shin ..................... H04W 24/10
(Continued)

FOREIGN PATENT DOCUMENTS

CN    106559443 A    9/2015
CN    108631917 A    3/2017
(Continued)

OTHER PUBLICATIONS

Cheng M, WO 2021097801 A1, Method For Enabling Packet Routing For Side Link Relay In Radio Access System, Involves Updating Packet Routing Information Of Nodes Within Side Link Relay Communication Path, And Releasing Side Link Relay Communication Path By Base Station, 2019 (Year: 2019).*
(Continued)

*Primary Examiner* — Frantz Coby
(74) *Attorney, Agent, or Firm* — Helen Mao; Imperium Patent Works

(57) ABSTRACT

Apparatus and methods are provided for path switch with service continuity for the UE from the indirect relay link to direct cell link or vice versa. In one novel aspect, the UE is configured with measurement report configuration, which includes triggering event for sending the measurement report. The network sends path switch command to the UE to initiate the path switch based on the measurement report. The UE path switch includes intra-gNB and inter-gNB path switch between the indirect relay link and the direct cellular link. The triggering events are a measurement of the target
(Continued)

direct Uu link is an offset better than a measurement of the serving sidelink for a indirect link to direct link switch and a measurement of the PC5 link is better than a predefined threshold for direct link to indirect link switch.

20 Claims, 9 Drawing Sheets

Related U.S. Application Data a continuation of application No. PCT/CN2020/074410, filed on Feb. 6, 2020.

(51) Int. Cl.
  *H04W 36/00* (2009.01)
  *H04W 76/14* (2018.01)
  *H04W 76/20* (2018.01)
  *H04W 88/04* (2009.01)
  *H04W 92/18* (2009.01)

(52) U.S. Cl.
  CPC ............ *H04W 76/20* (2018.02); *H04W 88/04* (2013.01); *H04W 92/18* (2013.01)

(58) Field of Classification Search
  USPC ........................................................... 370/329
  See application file for complete search history.

(56) References Cited

U.S. PATENT DOCUMENTS

| | | | | |
|---|---|---|---|---|
| 11,546,937 | B2* | 1/2023 | Cao | H04L 1/1887 |
| 11,632,693 | B2* | 4/2023 | Chae | H04W 72/52 |
| | | | | 370/230 |
| 11,659,551 | B2* | 5/2023 | Cao | H04W 72/02 |
| | | | | 370/330 |
| 11,683,754 | B2* | 6/2023 | Uchiyama | H04W 4/40 |
| | | | | 370/311 |
| 11,706,653 | B2* | 7/2023 | Tseng | H04W 24/10 |
| | | | | 370/252 |
| 2017/0150490 | A1 | 5/2017 | Chen | H04B 1/3822 |
| 2018/0213577 | A1 | 7/2018 | Burbidge | H04W 76/10 |
| 2019/0313315 | A1* | 10/2019 | Xu | H04W 24/10 |
| 2023/0296752 | A1* | 9/2023 | Thomas | H04L 5/0048 |
| | | | | 342/125 |

FOREIGN PATENT DOCUMENTS

| | | | | |
|---|---|---|---|---|
| CN | 109429373 A | | 6/2017 | |
| CN | 110546994 A | | 6/2017 | |
| WO | WO-2021097808 A1 * | | 5/2021 | ............ H04W 24/10 |

OTHER PUBLICATIONS

European Intellectual Property Office Action 21750595.7-1215, dated Nov. 27, 2023 (9 pages).
China Intellectual Property Office Action 202180013386.8, dated Dec. 7, 2024 (11 pages).
International Search Report and Written Opinion of International Search Authority for PCT/CN2021/075459 dated Apr. 27, 2021 (9 pages).
ETSI MCC Draft Report of 3GPP TSG RAN WG2 metting #91bis 3GPP TSG-RAN Working Group 2 meeting #92 R2-156049 Nov. 20, 2015 (Nov. 20, 2015) the whole document.

* cited by examiner

METHODS AND APPARATUS OF PATH SWITCH BASED SERVICE CONTINUITY FOR UE-TO- NETWORK RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2021/075459, titled "Methods and Apparatus of Path Switch based Service Continuity for UE-to-Network Relay," with an international filing date of Feb. 5, 2021. Internal Application No. PCT/CN2021/075459, in turn, claims priority under 35 U.S.C. § 120 and § 365(c) from International Application No. PCT/CN2020/074410, titled "Methods and Apparatus of Path Switch based Service Continuity for UE-to-Network Relay," with an international filing date of Feb. 6, 2020. This application is a continuation of International Application No. PCT/CN2021/075459. International Application No. PCT/CN2021/075459 is pending as of the filing date of this application, and the United States is an elected state in International Application No. PCT/CN2021/075459. The disclosure of each of the foregoing documents is incorporated herein by reference.

TECHNICAL FIELD

The disclosed embodiments relate generally to wireless communication, and, more particularly, to path switch-based service continuity for UE-to-Network relay.

BACKGROUND 5G radio access technology will be a key component of the modern access network. It will address high traffic growth and increasing demand for high-bandwidth connectivity. Wireless relay in cellular networks provides extended coverage and improved transmission reliability. Long term evolution (LTE) network introduced 3GPP sidelink, the direct communication between two user equipment (UEs) without signal relay through a base station. In 3GPP New Radio (NR), sidelink continues evolving. With new functionalities supported, the sidelink offers low latency, high reliability and high throughout for device to device communications. Using sidelink for wireless relay provides a reliable and efficient way for traffic forwarding. For the early sidelink-based wireless relay services, such as the ProSe UE-to-Network relay, the traffic between the remote UE and the base station is forwarded at the IP layer by the relay UE. The relay operation was specified for LTE aiming at coverage expansion from the perspective of Layer-3 (L3) relay. The Layer-2 (L2) based relay using sidelink can improve the efficiency and flexibility. With the adaption of the sidelink relay, the path switch between direct cellular link and the sidelink relay link, and vice versa are new use cases not addressed by the current network design. The issues of maintain the service continuity during the path switch needs to be addressed.

Improvements and enhancements are required for path switch for service continuity for the UE-to-Network relay.

SUMMARY

Apparatus and methods are provided for path switch with service continuity for the UE from the indirect relay link to direct cell link or vice versa. In one novel aspect, the UE is configured with measurement report configuration, which includes one or more triggering events for sending the measurement report. The network sends path switch command to the UE to initiate the path switch based on the measurement report. The UE path switch includes intra-gNB and inter-gNB path switch between the indirect relay link and the direct cellular link.

In one embodiment, the UE establishes an indirect connection with a source gNB through a sidelink relay path in the NR wireless network, wherein the sidelink relay path has at least one serving relay UE connecting with the UE through a serving sidelink, receives a measurement configuration including a frequency list for measurement from the source gNB, wherein the frequency list including a list of one or more Uu direct links and one or more PC5 sidelinks, sends a measurement report upon detecting a predefined path switching triggering event based on the received measurement configuration, receives a path switching message from the source gNB indicating to switch from the sidelink relay path to a target direct Uu link, and performs a path switching with service continuity by establishing a connection with the target direct Uu link based on the path switching message. In one embodiment, the predefined path switching triggering event is a measurement of the target direct Uu link is an offset better than a measurement of the serving sidelink with the serving relay UE. In another embodiment, the path switching message is a RRC Reconfiguration message from the source gNB.

In one embodiment, the UE with a source Uu link in the NR wireless network, receives from the source gNB, a message for one or more path switching triggering events, sends a response to the source gNB upon detecting at least one path switching triggering event, receives a path switching message from the source gNB indicating to switch from the source Uu link to a sidelink relay path, and performs a path switching with service continuity by establishing a sidelink with a relay UE in the sidelink relay path based on the path switching message. In one embodiment, the message for one or more path switching triggering events is a measurement configuration, and wherein the one or more path switching triggering events comprising a measurement of the PC5 link is an offset better than the source Uu link, and a measurement of the PC5 link is better than a predefined threshold. In another embodiment, the response to the source gNB is a measurement report. In another embodiment, the message for one or more path switching triggering events is a Uu RRC message of a Relay Discovery Command that includes an ID of the relay UE. In another embodiment, the performing the path switch involves receiving, from the relay UE, a PC5 RRC message of a layer-2 (L2) RLC Channel Establishment Request including a configuration for one or more RLC relay channels over the sidelink.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
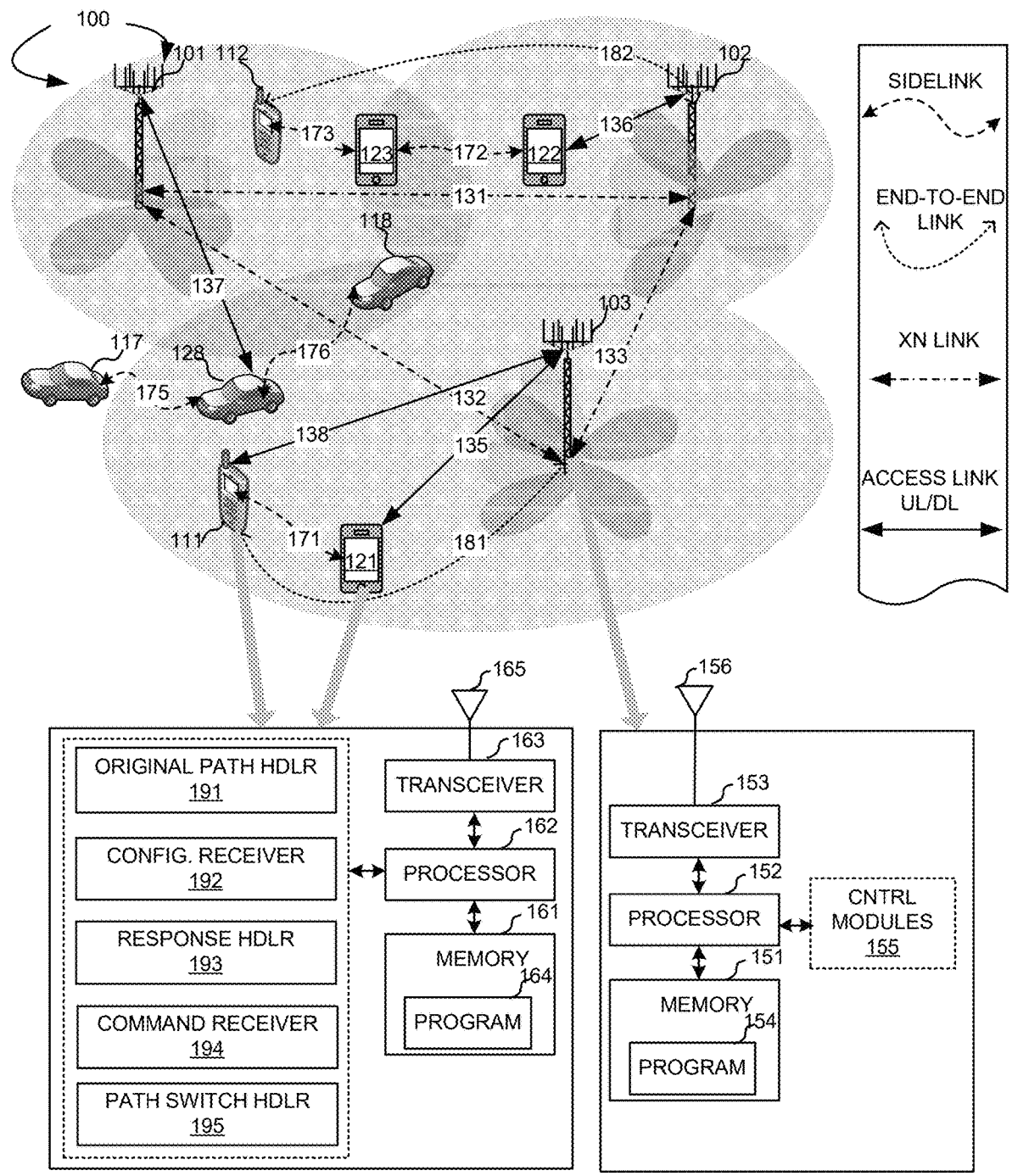
FIG. 1 is a schematic system diagram illustrating exemplary NR wireless network for path switch based service continuity in accordance with embodiments of the current invention.

FIG. 1 is a schematic system diagram illustrating exemplary NR wireless network for path switch-based service continuity in accordance with embodiments of the current invention. NR wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101, gNB 102 and gNB 103 are base stations in the NR network, the serving area of which may or may not overlap with each other. Backhaul connections such as 131, 132, and 133, connect the non-co-located receiving base units, such as gNB 101, 102 and 103. These backhaul connections can be either ideal or non-ideal. gNB 101 connects with gNB 102 via Xnr interface 131 and connects with gNB 103 via Xnr interface 132. gNB 102 connects with gNB 103 via Xnr interface 133.

NR wireless network 100 also includes multiple communication devices or mobile stations, such user equipments (UEs) such as UEs 111, 112, 113, 117, 118, 121, 122, 123, and 128. Communication devices or mobile stations in NR wireless network 100 may also be referred to as a mobile station, a mobile terminal, a mobile phone, smart phone, wearable, an IoT device, a table let, a laptop, or other terminology used in the art. It may also refers to devices with wireless connectivity in a vehicle, such as mobile devices 118, 117 and 128. The exemplary mobile devices in wireless network 100 have sidelink capabilities. The mobile devices can establish one or more connections with one or more base stations, such as gNB 101, 102, and 103. The mobile device, such as mobile device 117, may also be out of connection with the base stations with its access links but can transmit and receive data packets with another one or more other mobile stations or with one or more base stations through L2-based sidelink relay.

Data packets are forwarded by one or more relay UEs based on information in L2 header. A remote UE 111 and gNB 103 forms an end-to-end path 181 through a L2-based sidelink relay with a relay UE 121. End-to-end path 181 includes an access link 135 between gNB 103 and relay UE 121 and a sidelink 171 between remote UE 111 and relay UE 121. In one embodiment, the remote UE 111 also has a direct access link 138 with gNB 103. In other embodiments, the L2-based sidelink relay is a multi-hop relay with multiple relay UEs. A remote UE 112 and gNB 102 forms an end-to-end path 182 through a L2-based sidelink relay with a relay UE 122 and another relay UE 123. End-to-end path 182 includes an access link 136 between gNB 102 and relay UE 122, sidelink 172 between relay UE 122 and relay UE 123, and sidelink 173 between remote UE 112 and relay UE 123. In yet another embodiment, a relay mobile device is configured with multiple remote mobile devices or multiple end node mobile devices. A relay UE 128, with an access link 137 to gNB 101 is configured with two remote UEs 117 and 118 through sidelink 175 and 176, respectively. In one embodiment, the UE-to-Network L2-based sidelink relay includes one or more remote UEs being the out-of-coverage UEs, such as remote UE 117. Different links are established for the illustrated relay paths. An access link is a link between a base station, such as gNB and a mobile device, such as a UE. The UE can be a remote UE or a relay UE. The access link includes both the uplink (UL) and the downlink (DL) between the base station and the mobile device. The interface for the access link is an NR Uu interface. In one embodiment, the remote UE also establishes access link with a base station, such as remote UE 111 establishes the access link 138 with gNB 103. A sidelink is a link between two mobile devices and uses PC5 interface. The sidelink can be a link between a remote UE/end-node UE and a relay UE or a link between two relay mobile devices/UEs for the multi-hop relay. The end-to-end link for a relay path can be a link between two end-node mobile devices for a UE-to-UE relay or a base station to mobile device for a UE-to-Network relay. An Xn link is the backhaul link between two base stations, such gNBs using the Xn interface. In one embodiment, candidate relay UE information is transmitted to the base station via the Xn link.

In one novel aspect, for a UE-to-Network connection, path switch between the direct Uu/cellular connection and the indirect link through sidelink relay is performed with service continuity. For example, UE 121 is connected with gNB 103 via sidelink relay through path 181 which includes the sidelink 171 and Uu direct link 138. A path switch is triggered upon one or more predefined triggering events. UE 121 performs the path switch to the Uu direct link 135 with service continuity. In a different scenario, when UE 121 is connected with gNB 103 with direct link 135, it performs path switch to the relay path 181 with sidelink relay through UE 111. The path switch is performed with service continuity.

FIG. 1 further illustrates simplified block diagrams of a base station and a mobile device/UE for adaptation handling for L2-based sidelink relay. gNB 103 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 103. Memory 151 stores program instructions and data 154 to control the operations of gNB 103. gNB 103 also includes a set of control modules 155 that carry out functional tasks to communicate with mobile stations.

FIG. 1 also includes simplified block diagrams of a UE, such as relay UE 121 or remote UE 111. The UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in the UE. Memory 161 stores program instructions and data 164 to control the operations of the UE. Antenna 165 sends uplink transmission and receives downlink transmissions to/from antenna 156 of gNB 103.

The UE also includes a set of control modules that carry out functional tasks. These control modules can be implemented by circuits, software, firmware, or a combination of them. An original path handler 191 establishes an indirect connection with a source gNB through a sidelink relay path in the NR wireless network, wherein the sidelink relay path has at least one serving relay UE connecting with the UE through a serving sidelink. A configuration receiver 192 receives a measurement configuration including a frequency list for measurement from the source gNB, wherein the frequency list including a list of one or more Uu direct links and one or more PC5 sidelinks. A response handler 193 sends a measurement report upon detecting a predefined path switching triggering event based on the received measurement configuration. A command receiver 194 receives a path switching message from the source gNB indicating to switch from the sidelink relay path to a target direct Uu link. A path switch handler 195 performs a path switching with service continuity by establishing a connection with the target direct Uu link based on the path switching message.

Figure 2:
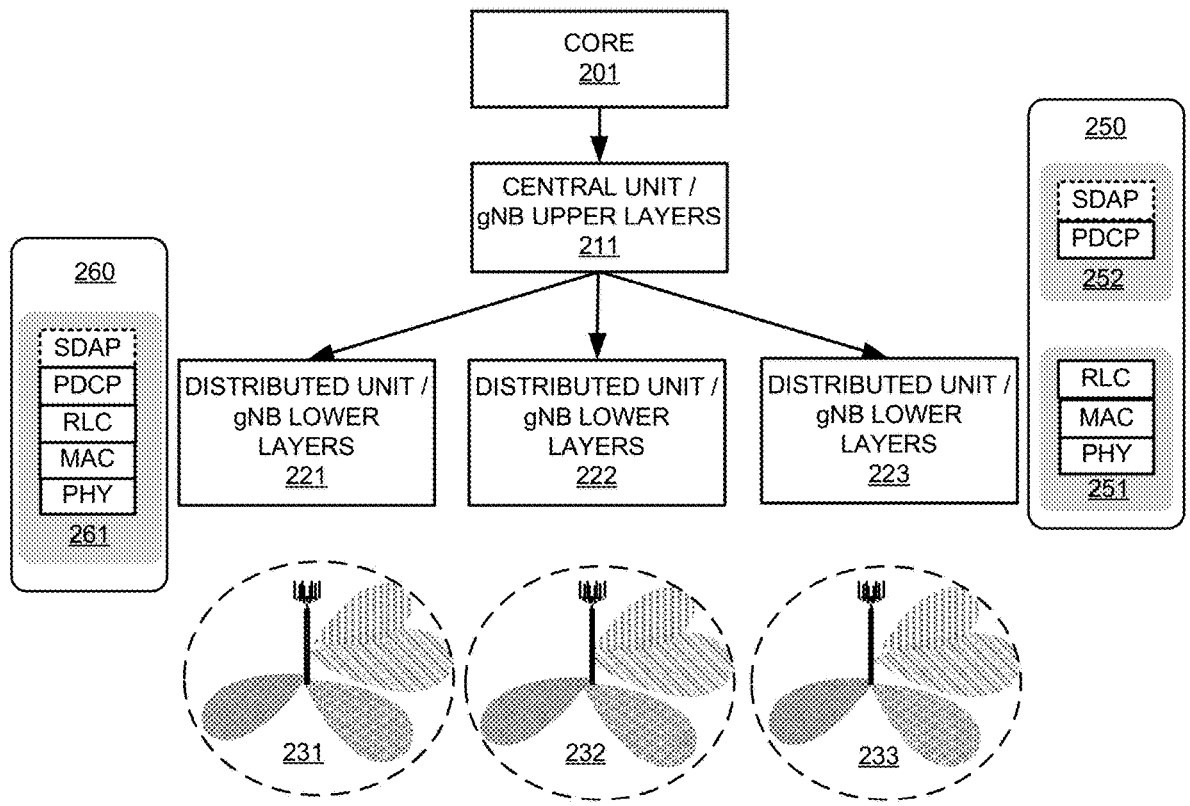
FIG. 2 illustrates an exemplary NR wireless system with centralized upper layers of the NR radio interface stacks in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 connects with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

The communication based on UE-to-Network Relay requires service continuity during communication path switch between a direct Uu path and an indirect Uu path via a UE-to-Network relay. There are different scenarios for the UE-to-Network relay path switch with sidelink relay.

Figure 3:
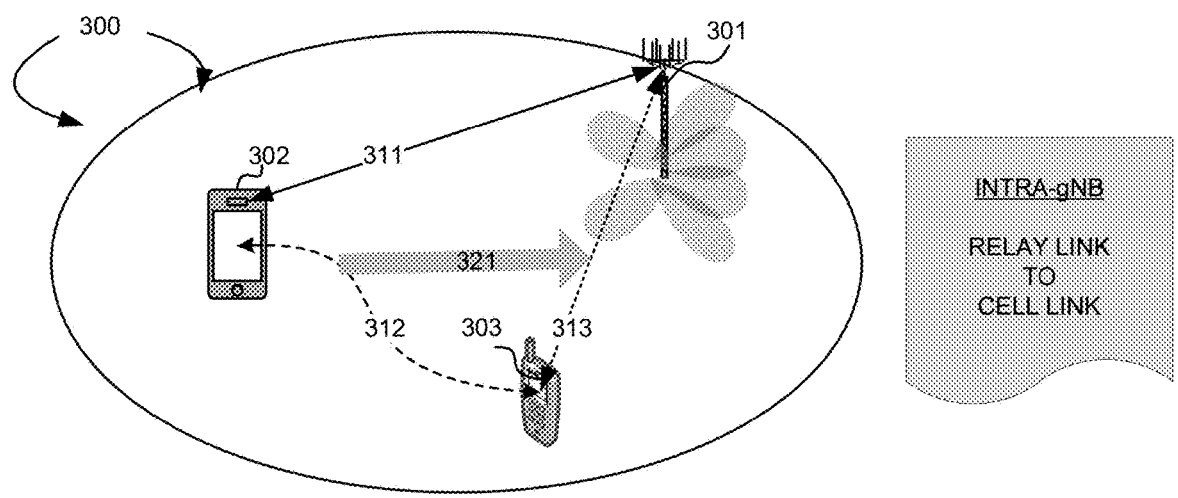
FIG. 3 illustrates an exemplary Intra-gNB path switch scenario from the indirect relay link to the direct cell link in accordance with embodiments of the current invention.

FIG. 3 illustrates an exemplary Intra-gNB path switch scenario from the indirect relay link to the direct cell link in accordance with embodiments of the current invention. A UE 303 is connected to a gNB 301 via an indirect link through a relay UE 302. The indirect link relay path includes the sidelink 312 between UE 303 and relay UE 302, and a Uu link 311 between relay UE 302 and gNB 301. In one embodiment, UE 303 receives measurement report and performs measurement on the relay link and direct Uu link. UE 303 is configured with triggering event to send the measurement report. The network upon receiving the measurement report from UE 303, determines to initiate the path switch. UE 303 receives path switch command. At step 321, UE switches path to Uu direct link 313 with gNB 301.

Figure 4:
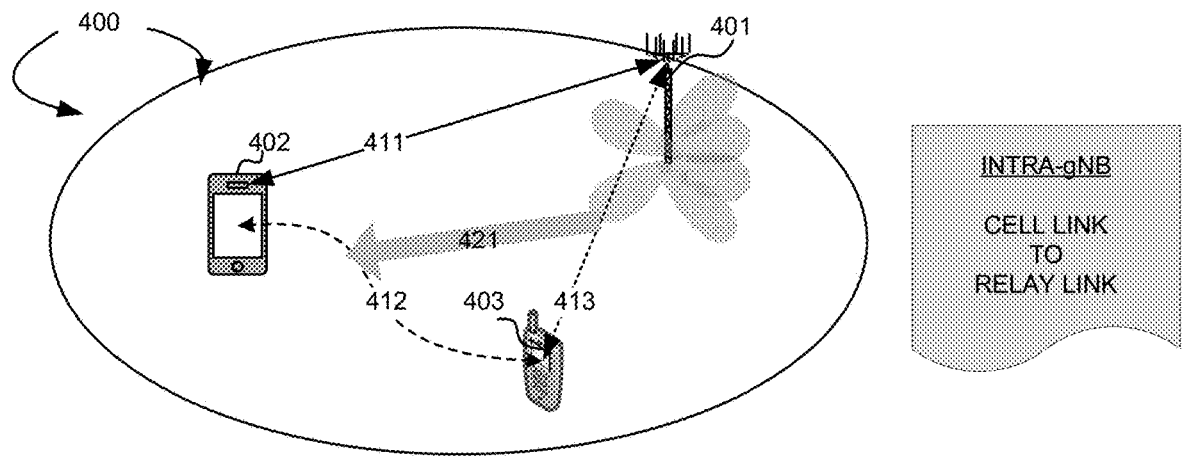
FIG. 4 illustrates an exemplary Intra-gNB path switch scenario from the direct cell link to the indirect relay link in accordance with embodiments of the current invention.

FIG. 4 illustrates an exemplary intra-gNB path switch scenario from the direct cell link to the indirect relay link in accordance with embodiments of the current invention. A UE 403 is connected to a gNB 401 via a direct Uu link 413. In one embodiment, the UE 403 receives measurement report configuration from the network including frequency list of both the Uu link with gNB and sidelink with relay UE. UE 403 performs PC5-S discovery with relay UE 402. Upon detecting predefined triggering event, UE 403 sends measurement report to the network. The network determines to perform a path switch. UE 403 receives path switch command from the network. At step 421, UE 403 switches path to indirect link with gNB 401. The indirect link includes a sidelink 412 between UE 403 and relay UE 402 and a Uu direct link 411 between relay UE 402 and gNB 401. In another embodiment, UE 403 receives a relay discovery command from gNB 401 and performs the PC5-S discovery with relay UE 402. UE 403 sends Sidelink UE Information (SUI) message to gNB 401. The network determines to perform a path switch. UE 403 receives path switch command from the network. At step 421, UE 403 switches path to indirect link with gNB 401. The indirect link includes a sidelink 412 between UE 403 and relay UE 402 and a Uu direct link 411 between relay UE 402 and gNB 401.

Figure 5:
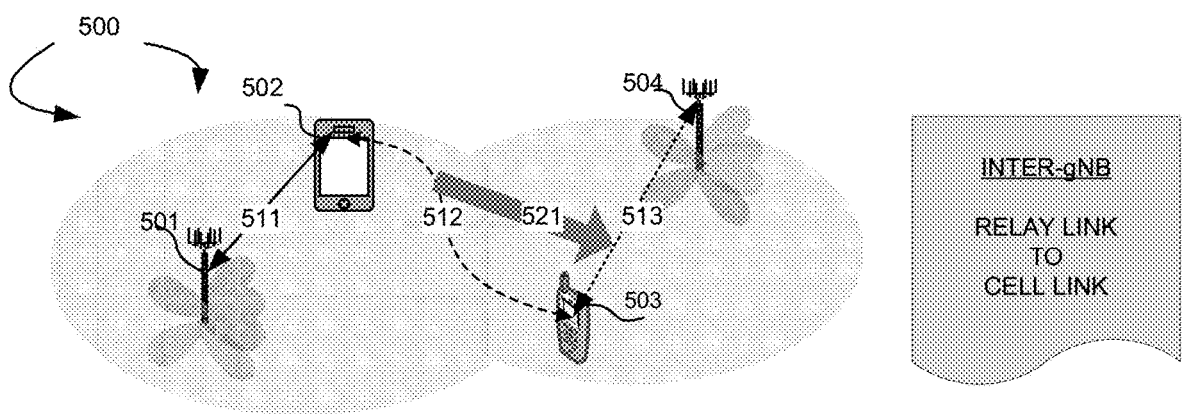
FIG. 5 illustrates an exemplary Inter-gNB path switch scenario from the indirect relay link to the direct cell link with a different gNB in accordance with embodiments of the current invention.

FIG. 5 illustrates an exemplary inter-gNB path switch scenario from the indirect relay link to the direct cell link with a different gNB in accordance with embodiments of the current invention. A UE 503 is connected to a gNB 501 via an indirect link through a relay UE 502. The indirect link relay path includes the sidelink 512 between UE 503 and relay UE 502, and a Uu link 511 between relay UE 502 and gNB 501. In one embodiment, UE 503 receives measurement report and performs measurement on the relay link and direct Uu link, including Uu link with a different gNB 504. UE 503 is configured with triggering event to send the measurement report. The network upon receiving the measurement report from UE 503, determines to initiate the path switch. UE 503 receives path switch command. At step 521, UE switches path to Uu direct link 513 with gNB 504.

Figure 6:
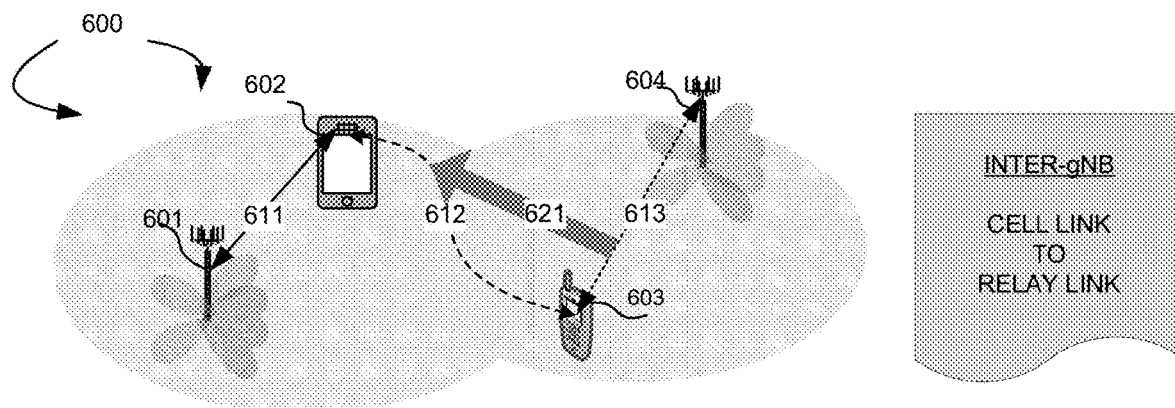
FIG. 6 illustrates an exemplary Inter-gNB path switch scenario from the direct cell link to the indirect relay link with a different gNB in accordance with embodiments of the current invention.

FIG. 6 illustrates an exemplary inter-gNB path switch scenario from the direct cell link to the indirect relay link with a different gNB in accordance with embodiments of the current invention. A UE 603 is connected to a gNB 604 via a direct Uu link 613. In one embodiment, the UE 603 receives measurement report configuration from the network including frequency list of both the Uu link with gNB and sidelink with relay UE. UE 603 performs PC5-S discovery with relay UE 602. Upon detecting predefined triggering event, UE 603 sends measurement report to the network. The network determines to perform a path switch. UE 603 receives path switch command from the network. At step 621, UE 603 switches path to an indirect link via relay UE 602 to different gNB 601. The indirect link includes a sidelink 612 between UE 603 and relay UE 602 and a Uu direct link 611 between relay UE 602 and gNB 601. In another embodiment, UE 603 receives a relay discovery command from gNB 604 and performs the PC5-S discovery with relay UE 602. UE 603 sends Sidelink UE Information (SUI) message to gNB 604. The network determines to perform a path switch. UE 603 receives path switch command from the network. At step 621, UE 603 switches path to an indirect link via relay UE 602 to different gNB 601. The indirect link includes a sidelink 612 between UE 603 and relay UE 602 and a Uu direct link 611 between relay UE 602 and gNB 601.

In one novel aspect, the sidelink relay for the path switch is layer-2 UE-to-network relay. When the relay UE and the remote UE established a PC5 unicast link, the relay UE and the remote UE are associated to perform traffic relaying. A remote UE-relay UE association, or relay UE-remote UE association is, thereby, formed. A pair of UE identities (e.g. UE L2 ID, index of UE ID or truncated version of UE ID) indicate this type of association.

Figure 7:
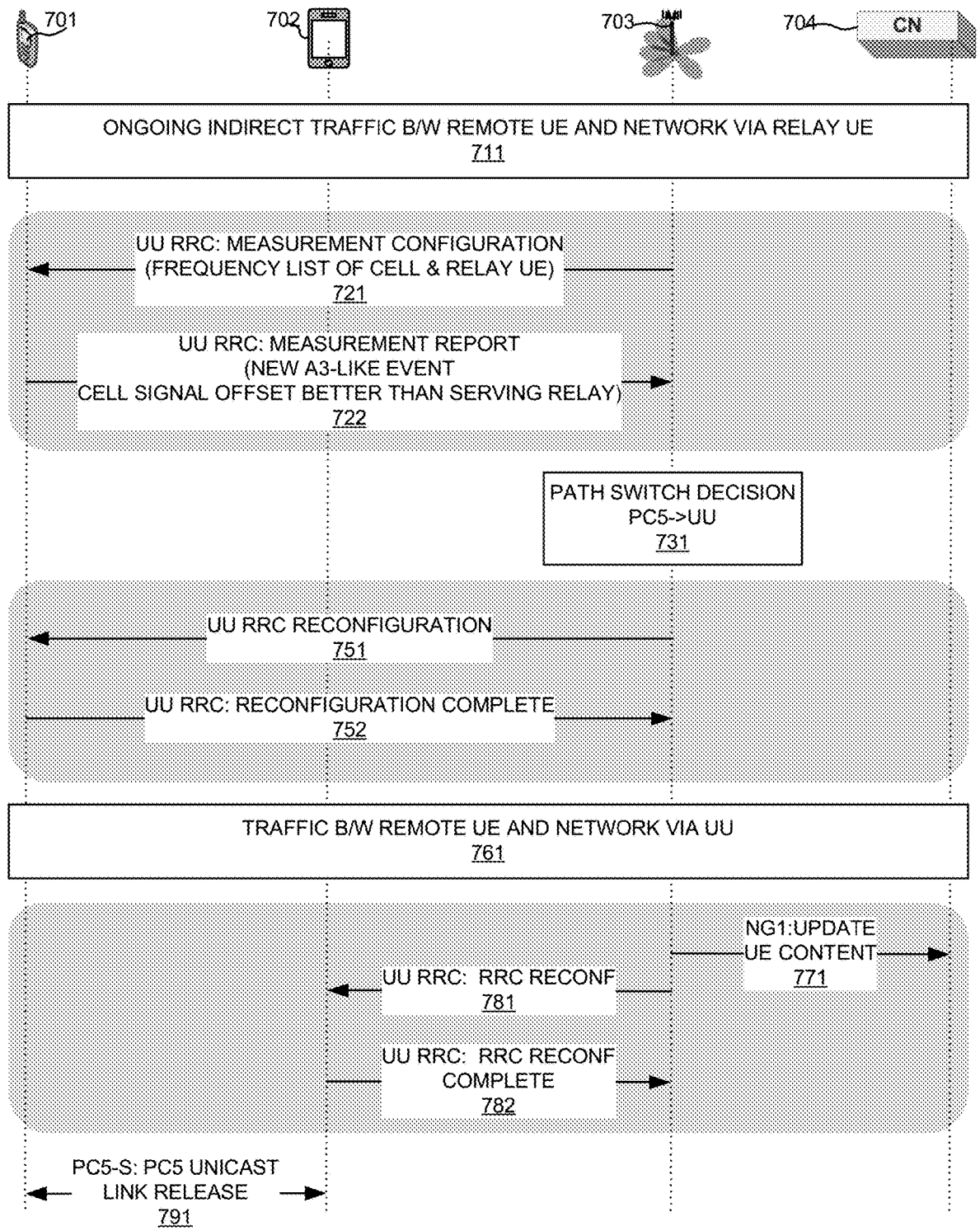
FIG. 7 illustrates an exemplary flow diagram of an Intra-gNB path switch from the indirect relay link to the direct cell link in accordance with embodiments of the current invention.

FIG. 7 illustrates an exemplary flow diagram of an intra-gNB path switch from the indirect relay link to the direct cell link in accordance with embodiments of the current invention. At step 711, there is an ongoing indirect traffic between a remote UE 701 and gNB 703 through a relay UE 702 in the NR wireless network with a core network (CN) entity 704. At step 721, gNB 703 sends the measurement configuration, via the relay link through relay UE 702, to remote UE 701 including the frequency list to be measured for the cellular link and/or relay link. At step 722, remote UE 701 sends Uu RRC message (e.g. Measurement Report) to the gNB 703 via the UE-to-Network Relay. The sending of the measurement report is triggered by one or more triggering events. In one embodiment, the triggering event is configured by the measurement report configuration at step 721. In another embodiment, a new A3-link event is defined as "cellular quality (Uu) offset better than serving relay UE (PC5)". UE 701 determines whether one or more triggering events are met based on its measurement results. At step 731, based on received RRC message, the measurement report, gNB 703 decides to handover the remote UE 701 from the UE-to-Network relay to the serving gNB 703.

At step 751, gNB 703 sends RRCReconfiguration message via the UE-to-Network relay to the remote UE 701 to configure the PHY, MAC, RLC, PDCP, and SDAP layers of the link between remote UE 701 and gNB 703. In another embodiment, the RRCReconfiguration message only configures the PHY, MAC and RLC layers of the link between remote UE 701 and gNB 703. From L2 relaying perspective, the PDCP and SDAP layer for remote UE terminate at remote UE 701 and gNB 703, there is no change on the PDCP/SDAP configuration after path switch. At step 752, remote UE 701 sends Reconfiguration Complete message gNB 703. At step 761, Uu interface (i.e. the direct path) can carry the traffic between remote UE 701 and gNB 703.

At step 771, gNB 703 and CN 704, such as an access and mobility management function (AMF), exchanges signaling to update the UE context. It is assumed both gNB and AMF (relay UE's AMF) stores remote UE-relay UE association within the relay UE context. The AMF is updated on the change of the association status (i.e. the release of the remote UE-relay UE association because of the PC5→Uu Switch). gNB 703 makes synchronized changes on the remote UE-relay UE association together with AMF. The status of remote UE-relay UE association is sent to remote UE's AMF in order to track the UE from mobility point of view.

At step 781, gNB 703 sends RRCReconfiguration message to the relay UE 702 to configure the PHY, MAC, RLC, PDCP, SDAP layers or any combination among them for the link between relay UE and base station. In one embodiment, the RRCReconfiguration message only configures the release list of the DRBs, for example only DRB-ToReleaseList is included within the IE RadioBearerConfig or RelayRadioBearerConfig. In another embodiment, the RRCReconfiguration message only indicates the index of remote UE-relay UE association, which implicitly means release all the DRBs established for relaying for this remote UE-relay UE association. For example, only a remote UE-relay UE association index is included in the DRB-ToReleaseList within the IE RadioBearerConfig or RelayRadioBearerConfig included in RRCReconfiguration message. At step 782, relay UE 702 sends RRCReconfigurationComplete message to the base station 703 when the reconfiguration completes. At step 791, the PC5 unicast link between remote UE 701 and the relay UE 702 is released via PC5-S signaling. The PC5 RRC connection between remote UE 701 and the relay UE 702 is released automatically.

Figure 8:
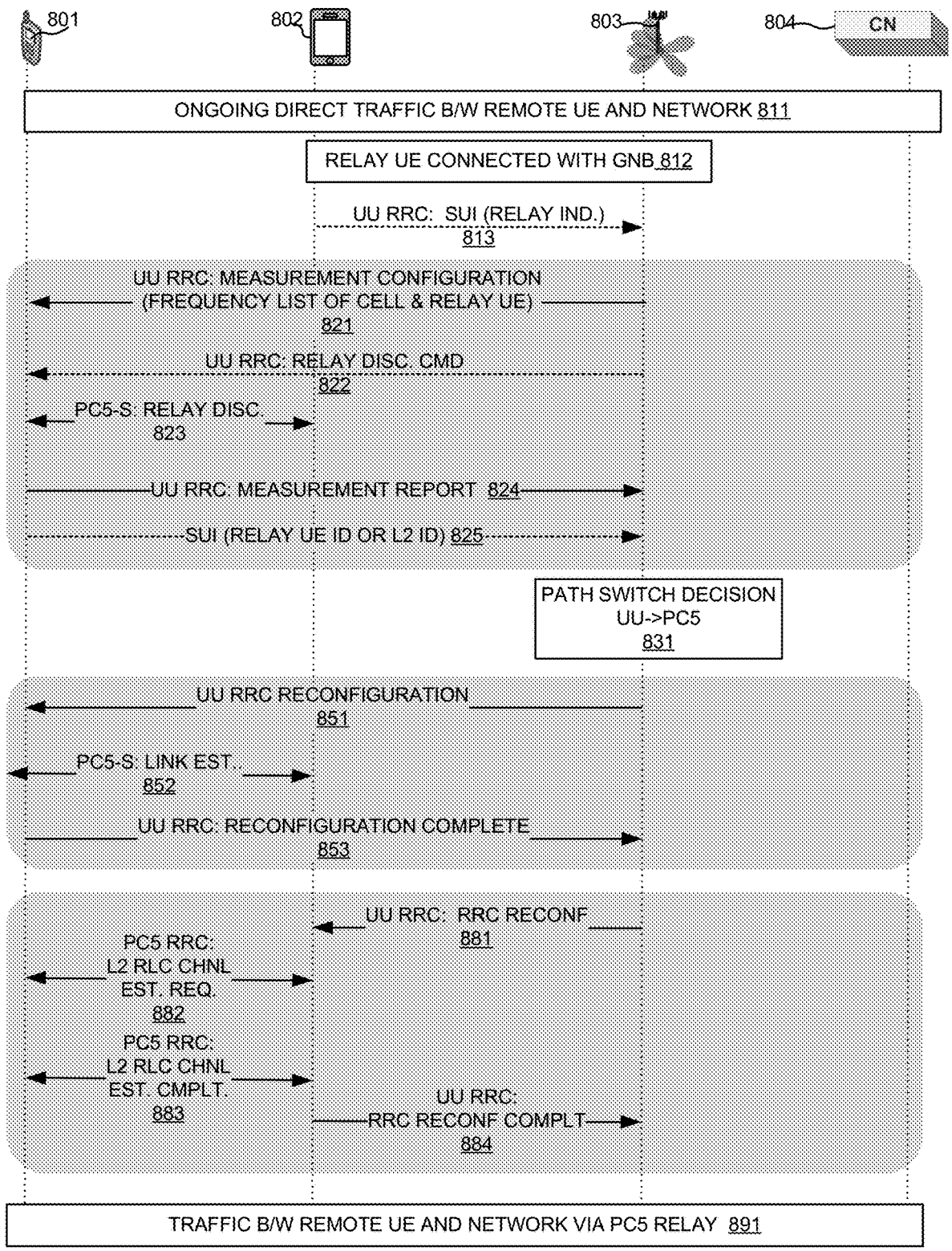
FIG. 8 illustrates an exemplary flow diagram of an Intra-gNB path switch from the direct cell link to the indirect relay link in accordance with embodiments of the current invention.

FIG. 8 illustrates an exemplary flow diagram of an Intra-gNB path switch from the direct cell link to the indirect relay link in accordance with embodiments of the current invention. At step 811, there is an ongoing direct traffic between a remote UE 801 and gNB 803 in the NR wireless network with a core network (CN) entity 704. At step 812, relay UE 802 is connected with remote UE's serving gNB 803. At step 813, relay UE 802 sends a relay indication to its serving gNB via an RRC message, e.g. SidelinkUEInformation. It indicates to gNB 803 that relay UE 802 can provide UE-to-Network relay in a certain frequency list. For example, during V2X platooning operation, the head node takes the responsibility to forward the member node's Uu traffic. In a scenario where relay UE allocated the remote UE's L2 ID before, the relay UE can include L2 UE ID of one or more remote UEs into the RRC message, e.g. SidelinkUEInformation, to inform the base station the one or more remote UEs the relay UE can establish relay link to.

In one embodiment, at step 821, gNB 803 sends the measurement configuration to remote UE 801 including the frequency list to be measured for cellular link and/or relay link. In another embodiment, at step 822, instead of the measurement configuration, the gNB 803 sends Uu RRC message, e.g. Relay Discovery Command to remote UE 801.

This can be triggered by an indication previously sent from remote UE to base station showing the interest to operate as remote UE via UE-to-Network relay in a certain frequency list. This can be also triggered by a relay indication sent from a relay UE at step 813 to the serving gNB 803, The RRC message of Relay Discovery Command includes relay UE identity information (e.g. L2 ID), which helps remote UE 801 to find the right relay UE for discovery. In another embodiment, the RRC message of Relay Discovery Command carries the content of measurement configuration message.

At step 823, remote UE 801 discovers relay UE 802 and selects relay UE 802 via PC5-S signaling. The triggered PC5-S relay discovery is based on the measurement event as configured in measurement configuration at step 821, or based on the criteria configured via system information, or (pre-)configuration for relay selection is met. Steps 821 and 822 configure the NR existing measurement event. In another embodiment, a new measurement event or criteria can be configured. This new event or criteria can be defined as "Relay UE quality (PC5) offset better than serving cell (Uu)", "Relay UE quality (PC5) better than an absolute threshold", or "Relay UE quality (PC5) offset better than an absolute threshold". Remote UE 801 evaluates the event or criteria for each measurement result before selecting the relay 802. If a relay UE L2 ID is provided at step 822 to remote UE 801, remote UE puts this ID into the PC5-S discovery message, e.g. a broadcasted Direct Communication Request, in order to establish the PC5 unicast link with the right relay UE. The expected effect is that only the right relay UE responds Direct Communication Response to remote UE 801. As an additional option, Remote UE's own L2 ID can be put into the PC5-S message for discovery purpose e.g. a broadcasted Direct Communication Request, in order to allow the Relay UE to determine his response based on upper layer or application layer restriction to the received Direct Communication Request. At step 824, remote UE sends Uu RRC message, e.g. Measurement Report, to the base station. In another embodiment, at step 825, remote UE 801 sends a Sidelink UE information message to the gNB 803. The Relay UE Identity information, e.g. Relay UE ID, is reported to the gNB 803. At step 831, based on the received RRC message, gNB 803 decides path switch for remote UE 801 to handover from the serving gNB 803 to the UE-to-Network Relay.

At step 851, gNB 803 sends RRCReconfiguration message to remote UE 801. gNB 803 instructs remote UE 801 to switch from the direct Uu PHY radio resource and to release the corresponding RLC entity and MAC entity for Uu based Radio Bearer(s). The SDAP and PDCP configuration of the Uu based Radio Bearer(s) is kept unchanged. gNB 803 instructs remote UE 801 to establish the unicast link with relay 802. At step 852, remote UE 801 establishes PC5-S link with relay UE 802. In one embodiment, the security is activated after the establishment of the unicast link between remote UE 801 and relay UE 802. At step 853, remote UE 801 sends RRCReconfigurationComplete message to the gNB 802.

At step 881, gNB 803 sends RRCReconfiguration message to the relay UE 802 to configure the PHY, MAC, RLC, PDCP, SDAP layers or any combination among them for the relaying bearer(s) between relay UE 802 and gNB 803. The existing RadioBearerConfig structure or a new defined RelayRadioBearerConfig structure is used to hold all of the Radio Bearer (i.e. RB) configuration for relaying. In one embodiment, relay UE 802 serves multiple remote UEs. Both relay UE 803 and its serving base station, gNB 803, maintain multiple relay UE-remote UE associations. The serving gNB can allocate one index for each relay UE-remote UE association for the relay UE. If the existing RadioBearerConfig structure is used to express the relaying RB configuration, additional fields (e.g. relaying RB indicator, index of each relay UE-remote UE association, remote UE ID) is needed to distinguish relaying RB from normal RB, and to distinguish different RBs for each relay UE-remote UE association. If a new defined RelayRadioBearerConfig structure is used to express the relaying RB configuration, additional fields (e.g. index of each relay UE-remote UE association, Remote UE ID) is needed to distinguish different RBs for each Relay UE-Remote UE association. In one embodiment, the SDAP-Config for relaying RB is omitted during RRC Reconfiguration, the establishment of relaying RB. When performing relay association, gNB maps the end-to-end RB to indirect RB (i.e. relaying RB) between relay UE and gNB and the flow concept is not applied any more after bearer mapping. Specifically, when multiple end-to-end RBs are mapped into one indirect RB, multiple SDAP-config in one indirect RB does not apply. The relaying RB configuration includes PDCP-config, while the cnAssociation IE, which is currently mandatory for DRB setup, is omitted. In one embodiment, the existing RadioBearerConfig structure or a new defined RelayRadioBearerConfig structure used to configure relaying RB(s) can include one or any combination of the following fields:

Relaying RB indicator
drb-Identity
pdcp-Config
Index of Relay UE-Remote UE association
Relay UE ID
Remote UE ID
Mapped end-to-end drb-Identity
L2 RLC channel ID of Sidelink for relaying
Logical channel ID of L2 RLC relay channel At step 882, upon receiving the RRCReconfiguration message from gNB 803, relay UE 802 initiates L2 RLC channel establishment procedure for relaying between relay UE 802 and remote UE 801 by sending L2 RCL Channel Establishment Request message. This RRC message includes one or a list of RLC Relay channel configuration. Each relay channel configuration includes the associated end-to-end Uu radio bearer index(es) (e.g., ServedRadioBearer), RLC layer index (e.g. sl-RLC-BearerConfigIndex), RLC configuration (e.g. sl-RLC-Config), MAC-logical channel configuration (e.g. sl-MAC-LogicalChannelConfig), sidelink logical channel ID, relay channel ID, the QoS profile of the QoS flow(s) within each associated end-to-end Uu radio bearer, or any combination among them. The RLC configuration includes RLC mode, SN length, etc. In another embodiment, the relay UE-remote UE association is also included in the message to indicate that the relay Channel is established for a relay UE-remote UE association. In one embodiment, the list of end-to-end radio bearer IDs is included for each relay channel within each relay channel configuration. It informs the remote UE the RLC channel that carries a particular end-to-end radio bearer. At step 882, remote UE 801 sends a PC5 RRC message, e.g. L2 RLC Channel Establishment Complete, to relay UE 802 to acknowledge the establishment of L2 RLC channel for relaying. In another embodiment, step 882 is triggered by step 851. The L2 RLC Channel Establishment Request is sent from remote UE 801 to relay UE 802 and relay UE 802 acknowledges L2 RLC Channel Establishment Complete to remote UE 801 when L2 RLC channel establishment completes. The RRC reconfiguration message at 851 carries the configuration of L2 RLC channel for relaying. At step 884, relay UE 802 sends RRCReconfigurationComplete message to gNB 803. At step 891, PC5 can carry the traffic between remote UE and network.

Figure 9:
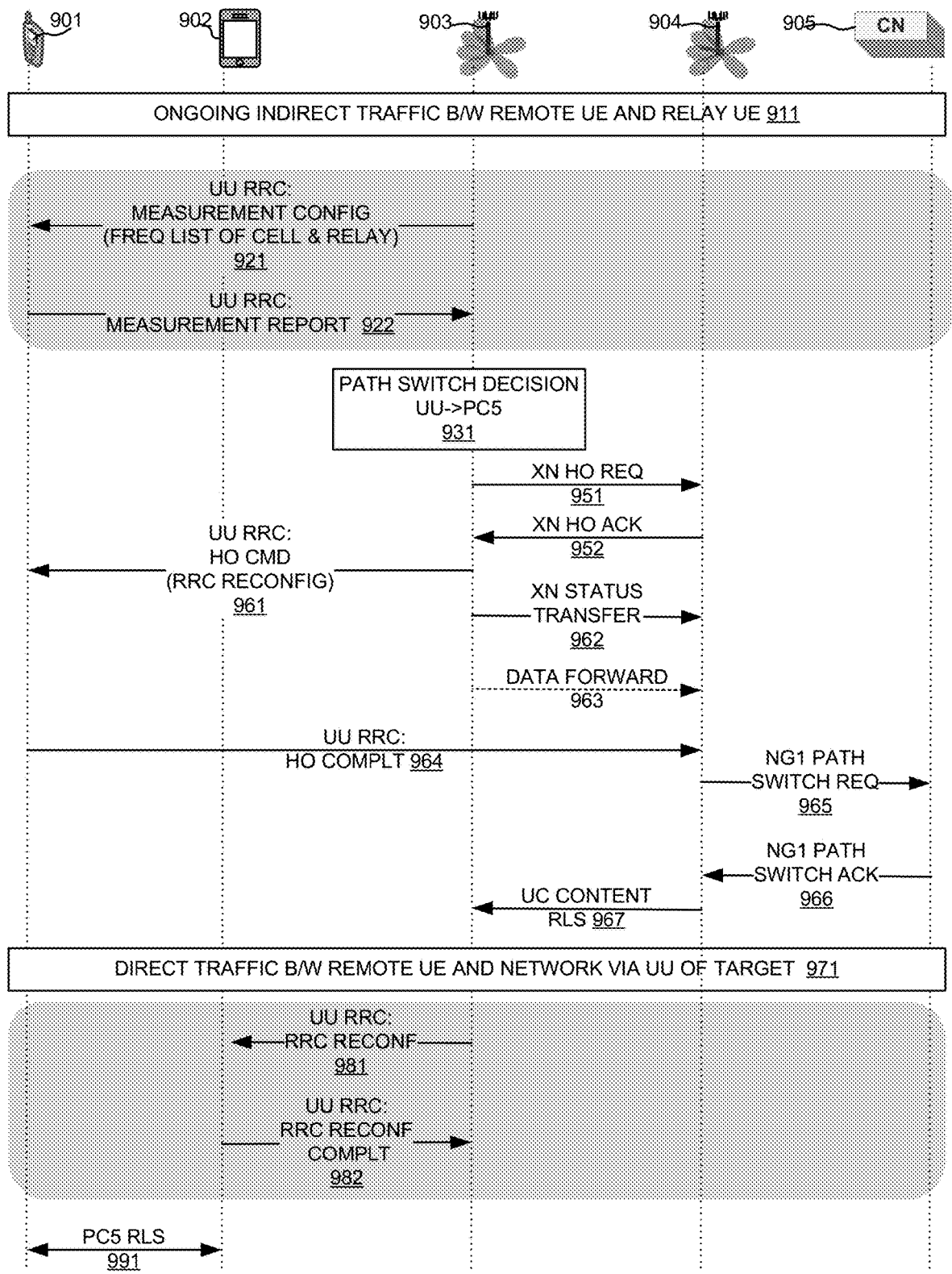
FIG. 9 illustrates an exemplary flow diagram of an Inter-gNB path switch from the indirect relay link to the direct cell link with a different gNB in accordance with embodiments of the current invention.

FIG. 9 illustrates an exemplary flow diagram of an inter-gNB path switch from the indirect relay link to the direct cell link with a different gNB in accordance with embodiments of the current invention. At step 911, there is an ongoing indirect traffic between a remote UE 901 and gNB 903 through a relay UE 902 in the NR wireless network with a core network (CN) entity 905. At step 921, gNB 903 sends the measurement configuration, via the relay link through relay UE 902, to remote UE 901 including the frequency list to be measured for the cellular link and/or relay link. At step 922, remote UE 901 sends Uu RRC message (e.g. Measurement Report) to the gNB 903 via the UE-to-Network Relay. The sending of the measurement report is triggered by one or more triggering events. In one embodiment, the triggering event is configured by the measurement report configuration at step 921. In another embodiment, a new A3-link event is defined as "cellular quality (Uu), including Uu link with a different gNB, offset better than serving Relay UE (PC5)". UE 901 determines whether one or more triggering events are met based on its measurement results. At step 931, based on received RRC message, the measurement report, gNB 903 decides to handover the remote UE 901 from the UE-to-Network relay to the serving gNB 903. At step 951, after the serving gNB 903 of remote UE 901 decides to switch the remote UE from relay link to cellular link, the source gNB 903 initiates HO request to the target gNB 904 for remote UE 901 via Xn interface. In another embodiment, the source gNB initiates HO request to a source CN entity 905, such as a source AMF, via N2 interface. Source AMF sends a HO required to the target AMF. The target AMF sends HO request to the target gNB 904 for remote UE 901. At step 951, the target gNB 904 responses the HO acknowledgement message via Xn interface. Alternatively, target gNB 904 responses the HO acknowledgement message to the target AMF via N2 interface. The target AMF responses HO acknowledgement to source AMF. The source AMF sends HO acknowledgement to the source gNB 903 for remote UE 901.

At step 961, the source gNB 903 delivers the Handover Command information to remote UE 901 via RRC reconfiguration message, which includes mobilitycontrolinfo. At step 962, the source gNB 903 sends SN Status Transfer to the target gNB 904. At step 963, the source gNB 903 forwards the data to the target gNB 904. At step 964, remote UE 901 sends RRC Reconfiguration Complete message to the target gNB 904. At step 965, the target gNB 904 sends a PATH SWITCH REQUEST message to AMF (in CN 905) to inform that the UE has changed cell. The path switch request may also update the remote UE's context, e.g. the status of remote UE-relay UE association in the AMF. At step 966, the AMF confirms the path switch message with the Path Switch Request Acknowledge message to target gNB 904. At step 967, the target gNB 904 notifies the source gNB 903 to release the UE context of remote UE 901. At step 971, the direct Uu interface between remote UE 901 and target gNB 904 carries the direct traffic between remote UE and network. At step 981, the source gNB of relay UE 902 (assuming the same source gNB for both remote UE and relay UE in this scenario) sends RRCReconfiguration message to the UE-to-Network relay UE 902. At step 982, relay UE 902 sends RRCReconfigurationComplete message to source gNB 903. At step 991, the PC5 unicast link between remote UE 901 and the relay UE 902 is released via PC5-S signaling. The PC5 RRC connection between remote UE 901 and the relay UE 902 is released automatically.

Figure 10:
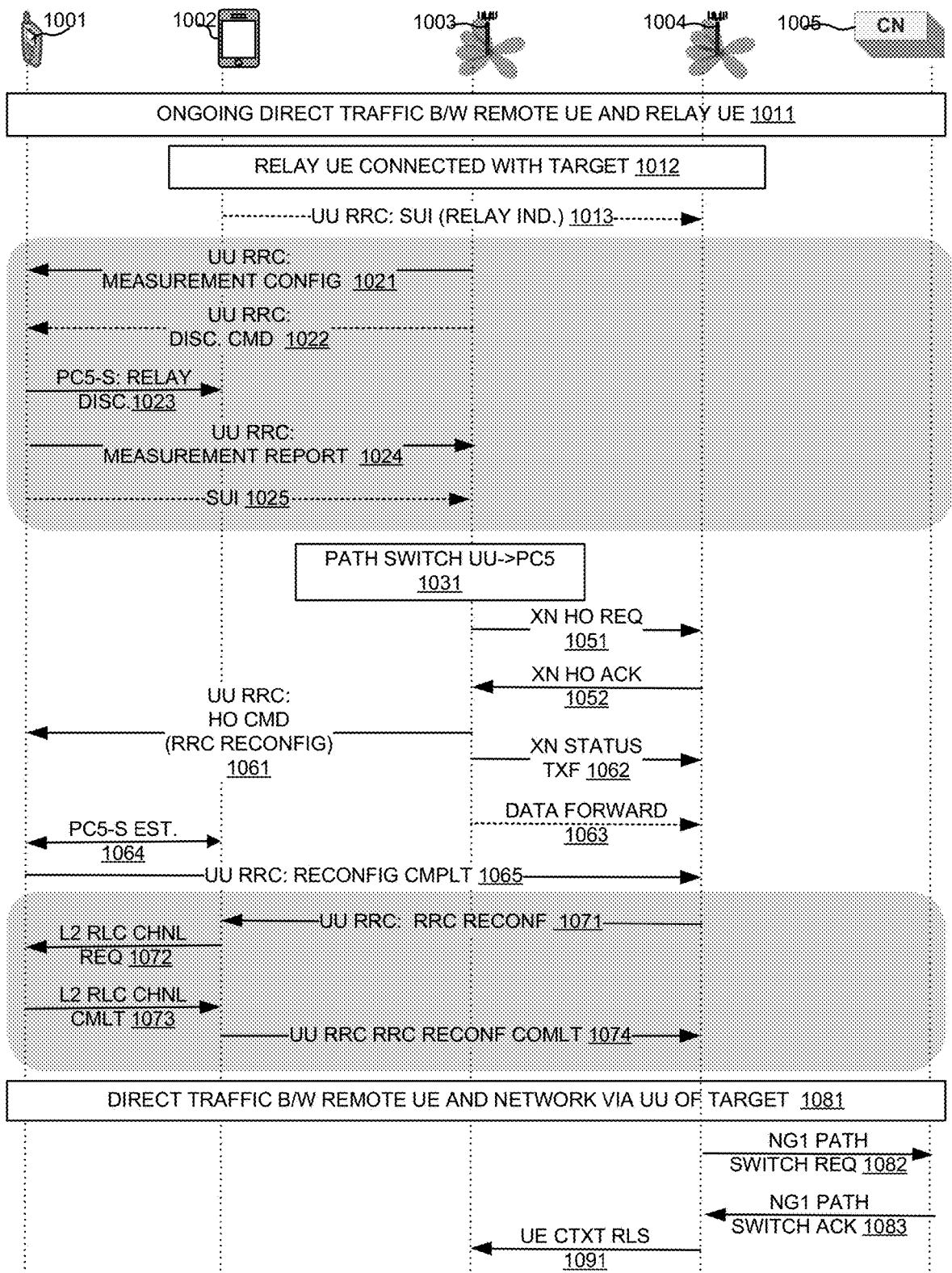
FIG. 10 illustrates an exemplary of the Inter-gNB path switch from the direct cell link to the indirect relay link with a different gNB in accordance with embodiments of the current invention.

FIG. 10 illustrates an exemplary of the inter-gNB path switch from the direct cell link to the indirect relay link with a different gNB in accordance with embodiments of the current invention. At step 1011, there is an ongoing direct traffic between a remote UE 1001 and gNB 1003 in the NR wireless network with a core network (CN) entity 1005. At step 1012, relay UE 1002 is connected with a target gNB 1004. At step 1013, relay UE 1002 sends a Relay indication to its serving gNB, target gNB 1004, via a RRC message e.g. SidelinkUEInformation. It indicates to gNB 1004 that relay UE 1002 can provide UE-to-Network relay in a certain frequency list.

In one embodiment, at step 1021, gNB 1003 sends the measurement configuration to remote UE 1001 including the frequency list to be measured for cellular link and/or relay link. In another embodiment, at step 1022, instead of the measurement configuration, the gNB 1003 sends Uu RRC message, e.g. Relay Discovery Command to remote UE 1001. This can be triggered by an indication previously sent from remote UE to base station showing the interest to operate as remote UE via UE-to-Network relay in a certain frequency list. In another embodiment, the RRC message of Relay Discovery Command carries the content of measurement configuration message.

At step 1023, remote UE 1001 performs relay discovery and selection. During the relay discovery stage, remote UE 1001 gets the serving cell ID of target gNB 1004 of relay UE 1002. The discovery between remote UE 1001 and relay UE 1002 is managed by PC5-S signaling. If no explicit relay discovery procedure is supported before sidelink communication, relay UE 1002 puts its serving cell ID of gNB 1004 into the PC5-S Direct Communication Response when accepting the PC5-S Direct Communication Request from remote UE 1001. If explicit relay discovery procedure proceeds before sidelink communication, relay UE puts its serving cell ID of gNB 1004 into the PC5-S Discovery Announcement (in discovery mode A) or Discovery Response (in discovery mode B). In one embodiment, remote UE 1001 and relay UE 1002 can put corresponding serving cell ID into the PC5-S signaling exchanged for the purpose of relay discovery. In one embodiment, relay UE 1002 reports the associated remote UE (including both remote UE L2 ID and serving cell ID of remote UE) to its serving gNB 1004 to allow the base station to prepare remote UE access, and/or coordinate with source gNB of remote UE.

At step 1024, remote UE 1001 sends Uu RRC message, e.g. Measurement Report, to source gNB 1003. In another embodiment, at step 1025, remote UE 1001 sends a Sidelink UE information message to the gNB 1003. The relay UE information and/or relay UE serving cell identity are reported to the target gNB 1004. The relay UE information includes one or more elements of relay UE L2 ID, C-RNTI, ShortMAC-I, or any combination among them. Relay UE serving cell identity can include CGI and/or PCI. At step 1031, serving gNB 1003 decides to switch remote UE 1001 from cellular link to relay link. At step 1051, source gNB 1003 initiates HO procedure. The relay UE-remote UE association is included in the HO Request message. At step 1052, source gNB 1003 receives the HO acknowledgement, which includes the relay UE-remote UE association. In one embodiment, multiple relay UE-remote UE associations are included in the HO Request and HO Ack messages.

At step 1061, source gNB 1003 delivers the handover command information to remote UE 1001 via RRC reconfiguration message, which includes mobilitycontrolinfo. gNB 1003 also instructs remote UE 1001 to establish the unicast link with relay UE 1002. At step 1062, the source gNB 1003 sends SN Status Transfer to the target gNB 1004. At step 1063, source gNB 1003 forwards the data to the target gNB 1004. At step 1064, the PC5-S unicast link is established between remote UE 1001 and relay UE 1002. At step 1065, remote UE 1001 sends RRCReconfiguration-Complete message to the target gNB 1004. At step 1071 target gNB 1004 sends RRCReconfiguration message to relay UE 1002. At step 1072, relay UE 1002 sends a PC5 RRC message, e.g. L2 RLC channel establishment request, to remote UE 1001. At step 1073, remote UE 1001 sends a PC5 RRC message e.g. L2 RLC channel establishment complete to relay UE 1002 to acknowledge the establishment of L2 RLC channel for relaying. In another embodiment, step 1072 is triggered by the Handover Command at step 1061. L2 RLC Channel Establishment Request is sent from remote UE 1001 to relay UE 1002. Relay UE 1002 acknowledges with L2 RLC Channel Establishment Complete to remote UE 1001. The Handover Command at step 1061, in this embodiment, carries the configuration of L2 RLC channel for relaying. At step 1074, relay UE 1002 sends RRCReconfigurationComplete message to the target gNB 1004, At step 1081, PC5 can carry the traffic between remote UE 1001 and Network 1005. At step 1082, target gNB 1004 sends a PATH SWITCH REQUEST message to AMF (in CN 1005) to inform that the UE has changed cell. At step 1083, the AMF confirms the path switch message with the Path Switch Request Acknowledge message to target gNB 1004. At step 1091, target gNB 1004 notifies the source gNB 1003 to release the UE context of remote UE 1001.

Figure 11:
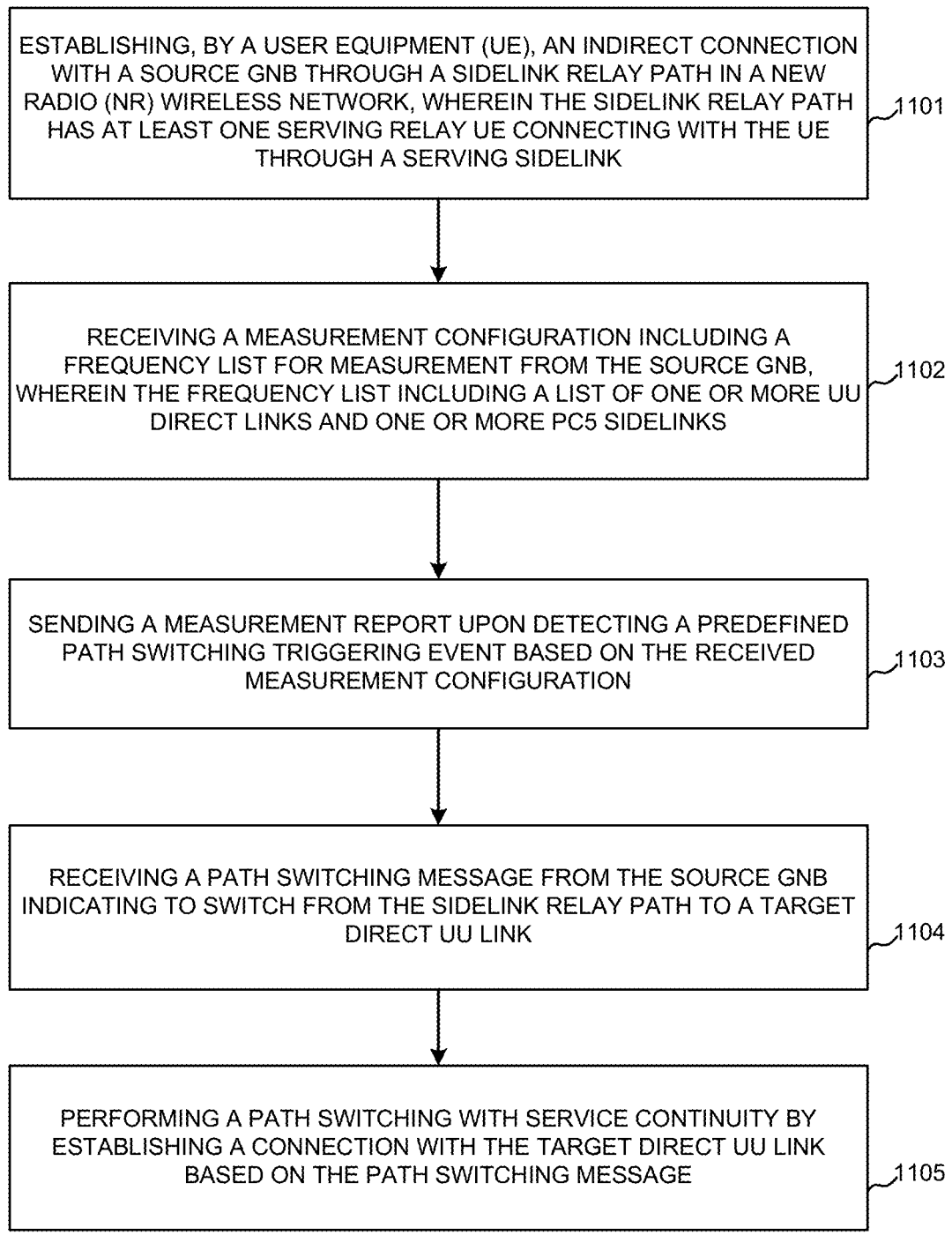
FIG. 11 illustrates an exemplary flow chart for a path switch from an indirect relay link to a direct Uu link with service continuity in accordance with embodiments of the current invention.

FIG. 11 illustrates an exemplary flow chart for a path switch from an indirect relay link to a direct Uu link with service continuity in accordance with embodiments of the current invention. At step 1101, the UE establishes an indirect connection with a source gNB through a sidelink relay path in a new radio (NR) wireless network, wherein the sidelink relay path has at least one serving relay UE connecting with the UE through a serving sidelink. At step 1102, the UE receives a measurement configuration including a frequency list for measurement from the source gNB, wherein the frequency list including a list of one or more Uu direct links and one or more PC5 sidelinks. At step 1103, the UE sends a measurement report upon detecting a predefined path switching triggering event based on the received measurement configuration. At step 1104, the UE receives a path switching message from the source gNB indicating to switch from the sidelink relay path to a target direct Uu link. At step 1105, the UE performs a path switching with service continuity by establishing a connection with the target direct Uu link based on the path switching message.

Figure 12:
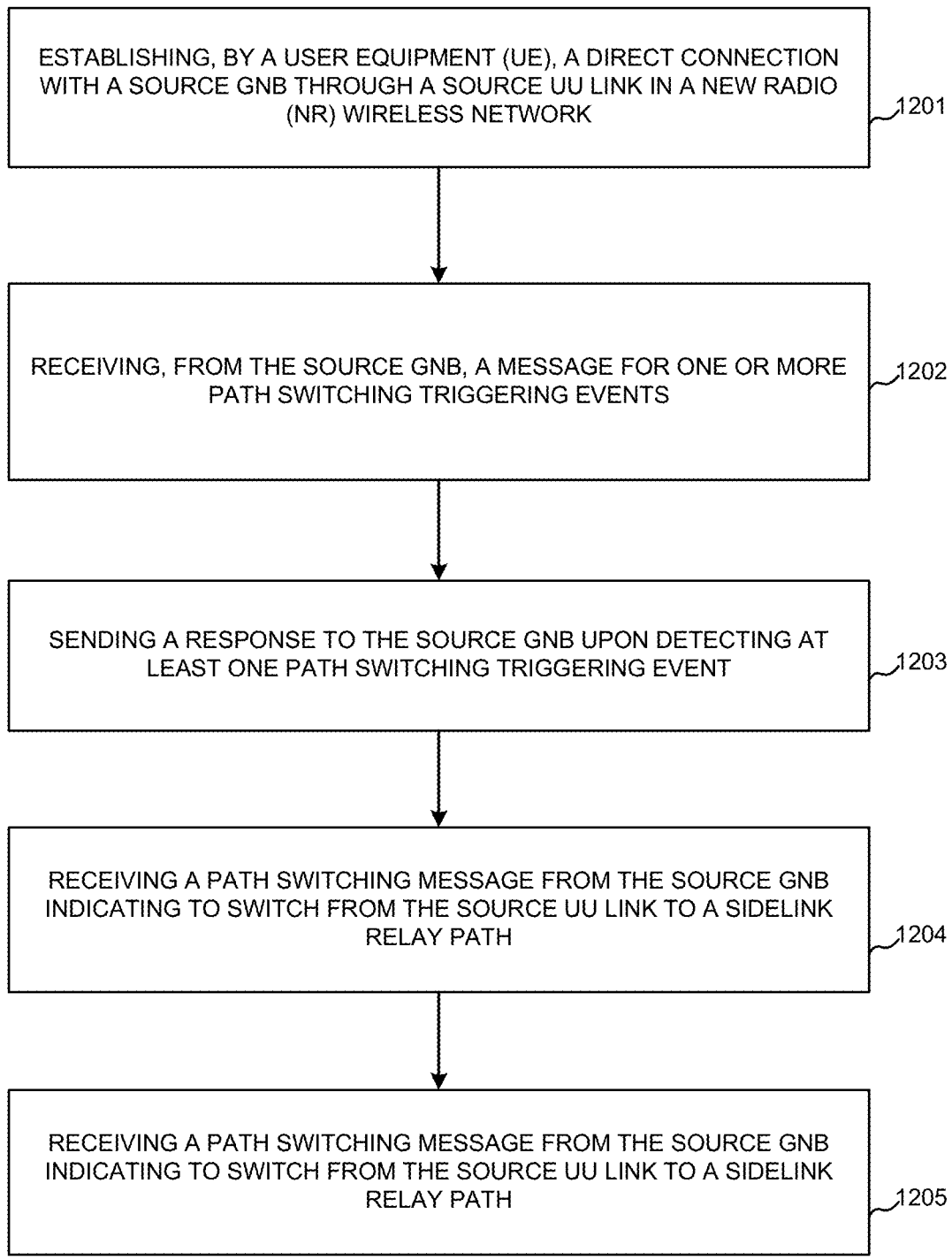
FIG. 12 illustrates an exemplary flow chart for a path switch from a direct Uu link to an indirect relay link with service continuity in accordance with embodiments of the current invention.

FIG. 12 illustrates an exemplary flow chart for a path switch from a direct Uu link to an indirect relay link with service continuity in accordance with embodiments of the current invention. At step 1201, the UE establishes a direct connection with a source gNB through a source Uu link in a new radio (NR) wireless network. At step 1202, the UE receives a message for one or more path switching triggering events from the source gNB. At step 1203, the UE sends a response to the source gNB upon detecting at least one path switching triggering event. At step 1204, the UE receives a path switching message from the source gNB indicating to switch from the source Uu link to a sidelink relay path. At step 1205, the UE performs a path switching with service continuity by establishing a sidelink with a relay UE in the sidelink relay path based on the path switching message.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing, by a user equipment (UE), an indirect connection with a source gNB through a sidelink relay path in a new radio (NR) wireless network, wherein the sidelink relay path has at least one serving relay UE connecting with the UE through a serving sidelink;
   receiving a measurement configuration including a frequency list for measurement from the source gNB, wherein the frequency list including a list of one or more Uu direct links and one or more PC5 sidelinks;
   sending a measurement report upon detecting a predefined path switching triggering event based on the received measurement configuration;
   receiving a path switching message from the source gNB indicating to switch from the sidelink relay path to a target direct Uu link; and
   performing a path switching with service continuity by establishing a connection with the target direct Uu link based on the path switching message.

2. The method of claim 1, wherein the predefined path switching triggering event is a measurement of the target direct Uu link is an offset better than a measurement of the serving sidelink with the serving relay UE.

3. The method of claim 1, wherein the path switching message is a RRC Reconfiguration message from the source gNB.

4. The method of claim 3, wherein the RRC Reconfiguration message includes one or more elements comprising: a list of data radio bearers (DRBs) to be released, a Radio-BearerConfig information element (IE) with an index of relay UE-remote UE association, a new IE with an index of relay UE-remote UE association to indicate one or more relay radio bearers to be released.

5. The method of claim 1, wherein the direct target Uu link is with a new gNB, and wherein the path switching message is a RRC Reconfiguration message from the source gNB embedded a Handover Command.

6. A method comprising:
   establishing, by a user equipment (UE), a direct connection with a source gNB through a source Uu link in a new radio (NR) wireless network;
   receiving, from the source gNB, a message for one or more path switching triggering events;
   sending a response to the source gNB upon detecting at least one path switching triggering event;
   receiving a path switching message from the source gNB indicating to switch from the source Uu link to a sidelink relay path; and
   performing a path switching with service continuity by establishing a sidelink with a relay UE in the sidelink relay path based on the path switching message.

7. The method of claim 6, wherein the message for one or more path switching triggering events is a measurement configuration, and wherein the one or more path switching triggering events comprising a measurement of the PC5 link is an offset better than the source Uu link, and a measurement of the PC5 link is better than a predefined threshold.

8. The method of claim 7, wherein the response to the source gNB is a measurement report.

9. The method of claim 7, the message for one or more path switching triggering events is a Uu RRC message of a Relay Discovery Command that includes an ID of the relay UE.

10. The method of claim 9, wherein the response to the source gNB is a Sidelink UE Information (*SUI*) comprising one or more elements comprising the relay UE information and an ID of a serving cell for the relay UE.

11. The method of claim 6, wherein path switching message from the source gNB is a RRC Reconfiguration message that configures relay radio bearer for the sidelink relay path.

12. The method of claim 11, wherein the RRC Reconfiguration message includes one or more elements comprising a drb-Identity, a pdcp-Config, an index of Relay UE-Remote UE association, the UE ID of the Relay UE, a UE ID of the UE, a mapped end-to-end drb-Identity, an L2 RLC channel ID of the relay sidelink, and a Logical channel ID of a L2 RLC relay channel, and wherein the one or more elements are included in one structure selected from an existing RadioBearerConfig, and a new structure of Relay-RadioBearerConfig.

13. The method of claim 11, wherein the relay UE is connected with a target gNB, and wherein the RRC Reconfiguration message embedded a Handover Command.

14. The method of claim 6, wherein the performing the path switch involving: receiving, from the relay UE, a PC5 RRC message of a layer-2 (L2) RLC Channel Establishment Request including a configuration for one or more RLC relay channels over the sidelink.

15. The method of claim 14, wherein the configuration for one or more RLC relay channels includes one or more elements comprising: one or more associated end-to-end Uu Radio Bearer indexes, an RLC layer index, an RLC configuration, a MAC-logical channel configuration, a Sidelink logical channel ID, a Relay channel ID, and a QoS profile of one or more QoS flows within each associated end-to-end Uu radio bearer.

16. A user equipment (UE), comprising:
a transceiver that transmits and receives radio frequency (RF) signal in a new radio (NR) wireless network;
an original path handler that establishes an indirect connection with a source gNB through a sidelink relay path in the NR wireless network, wherein the sidelink relay path has at least one serving relay UE connecting with the UE through a serving sidelink;
a configuration receiver that receives a measurement configuration including a frequency list for measurement from the source gNB, wherein the frequency list including a list of one or more Uu direct links and one or more PC5 sidelinks;
a response handler that sends a measurement report upon detecting a predefined path switching triggering event based on the received measurement configuration;
a command receiver that receives a path switching message from the source gNB indicating to switch from the sidelink relay path to a target direct Uu link; and
a path switch handler that performs a path switching with service continuity by establishing a connection with the target direct Uu link based on the path switching message.

17. The UE of claim 16, wherein the predefined path switching triggering event is a measurement of the target direct Uu link is an offset better than a measurement of the serving sidelink with the serving relay UE.

18. The UE of claim 16, wherein the path switching message is a RRC Reconfiguration message from the source gNB.

19. The UE of claim 18, wherein the RRC Reconfiguration message includes one or more elements comprising: a list of data radio bearers (DRBs) to be released, a RadioBearerConfig information element (IE) with an index of relay UE-remote UE association, a new IE with an index of relay UE-remote UE association to indicate one or more relay radio bearers to be released.

20. The UE of claim 16, wherein the direct target Uu link is with a new gNB, and wherein the path switching message is a RRC Reconfiguration message from the source gNB embedded a Handover Command.

* * * * *